3,168,577
PRODUCTION OF ALKYL PHENOLS
Robert Weinstein, Flushing, N.Y., and Ira M. Rose, Millburn, and William R. Christian, Newark, N.J., assignors to Nopco Chemical Company, Newark, N.J., a corporation of New Jersey
No Drawing. Filed Mar. 28, 1961, Ser. No. 98,792
4 Claims. (Cl. 260—624)

This invention relates to the stabilization of alkyl phenols. More particularly it relates to an improved process for the production of alkyl phenols which are stabilized against dealkylation and decomposition.

Alkyl phenols are generally produced by reacting phenol with an alkylation agent, i.e., an olefin, in the presence of an acidic alkylation catalyst. Alkylation catalysts which have been found useful in such reactions are acid condensing catalysts such as, boron trifluoride, ferric chloride, hydrogen chloride, sulfuric acid and the like. The resulting crude reaction mixture is acidic due to the presence of the alkylation catalyst in the mixture. Whether monoalkyl phenols and/or polyalkyl phenols, such as dialkyl phenol, trialkyl phenol, etc., are produced in the above reactions will depend upon the mole ratio of reactants and catalysts, and specific reaction conditions such as temperature and pressure, employed in such reactions.

The resulting crude reaction mixture is made up of excess phenol, alkyl phenols and the alkylation catalyst. When it is desired to separate the desired alkyl phenol from the crude reaction mixture, the excess unreacted phenol and desired alkyl phenol are usually removed by fractional distillation under vacuum. However, the temperatures required to distill off the phenol and desired alkyl phenol cause the formation of undesirable polyalkyl phenols and decomposition products of the reactants. The formation of undesirable polyalkyl phenols and decomposition products of the reactants may be prevented by removing the alkylation catalyst and any acidic decomposition products caused by decomposition of the reactants during the reaction from the crude reaction mixture before distilling off the excess phenol from the crude reaction mass. This procedure is necessary when it is desired to produce specific alkyl phenols such as monoalkyl phenols, dialkyl phenols, trialkyl phenols, etc.

Prevention of the formation of polyalkyl phenols and decomposition products of the reactants is especially important when producing monoalkyl phenols. Monoalkyl phenols are highly useful as intermediates in the production of surfactants, dispersants and emulsifiers for use in the paper, textile and chemical industries. They are easily condensed with lower alkylene oxides by heating the reactants in the presence of a basic condensing catalyst such as potassium hydroxide to form condensates of the monoalkyl phenol and the lower alkylene oxide. In order to prepare these condensates, the crude reaction mixture containing the monoalkyl phenol, phenol and acid alkylation catalyst should be completely neutralized. This neutralization is necessary to prevent further formation of undesirable polyalkyl phenols and decomposition products of the reactants during the condensation reaction due to the presence of the alkylation catalyst and use of high temperatures required for such condensations. The prior art has sought to remove the alkylation catalyst by effecting the removal of the catalyst from the reaction mass by distillation and/or washing. However, the temperatures required to distill off the catalyst from the crude reaction mixture caused the formation of considerable amounts of undesirable polyalkyl phenols. Washings with water and dilute aqueous solutions such as dilute solutions of sodium hydroxide, potassium hydroxide, and ammonium hydroxide have also been used in attempts to neutralize and remove the acid alkylation catalyst from such crude reaction mixtures. For example, U.S. Patent No. 2,673,834, Stevens et al. March 30, 1954, discloses the use of a water wash followed by washing with dilute aqueous alkali solutions, i.e., aqueous 5 to 10 percent alkali solutions, to neutralize and remove the acid alkylation catalyst from such crude reaction mixtures. This patent warns against the use of dilute alkali solutions which are soluble in the crude reaction mixture and states that these solutions should not be used in such cases. It further teaches that such washings are not completely effective in neutralizing and removing the acid alkylation catalyst from the crude reaction mixture and therefore the mixture should be contacted with an adsorbent clay after such washing to effect complete removal of any acid alkylation catalyst and other acidic materials formed in the alkylation reaction remaining in the mixture. This method of neutralization and removal of the acid alkylation catalyst is inefficient due to the fact that about one-half of the reaction vessel used to produce the alkyl phenol must be utilized to hold the wash water used in effecting removal of the acid alkylation catalyst, thus lowering the amount of alkyl phenol produced. Also the alkyl phenol so treated must be dried before it can be used in most succeeding processes due to the large amount of water contained therein. Further, U.S. Patent No. 2,673,834 states that complete neutralization and removal of the acid alkylation catalyst from the crude reaction mass is effected only after the treated alkyl phenol has been further contacted with an adsorbent clay (see Example 2). Thus it is clearly apparent that the method of removing the acid alkylation catalyst by neutralization with dilute aqueous alkali solutions is costly and time consuming.

The art has also suggested the use of strong alkali such as, sodium hydroxide, potassium hydroxide, and sodium carbonate to effect the neutralization of the acidic alkylation catalyst in the crude reaction mixture, and thereafter employing distillation to separate the alkyl phenol from the neutralized crude reaction mixture. However, the use of such strong alkalies does not completely neutralize the acid alkylation catalyst in the crude reaction mixture and the temperatures required in such processes to distill off the alkyl phenol cause the formation of large quantities of undesirable polyalkyl phenols.

It is the object of this invention to provide a new and improved method for the production of alkyl phenols.

A further object of this invention is to provide a new and improved method of removing the acid alkylation catalyst from a crude reaction mixture containing alkyl phenol, phenol and the acid alkylation catalyst.

It is still a further object of this invention to provide for an improved neutralization procedure for removing acid alkylation catalyst from a crude reaction mixture containing alkylated phenol.

Another object of this invention is to provide a new and improved process for the production of condensates of alkyl phenols and lower alkylene oxides.

Other objects of this invention will in part be obvious and will in part appear hereinafter.

It has been discovered that the foregoing objects are readily accomplished by a process which involves the steps of neutralizing the boron trifluoride catalyst which is present in a crude reaction mixture containing alkylated phenol with an aqueous solution of ammonium hydroxide, containing from about 15 percent to about 30 percent by weight of ammonia, based on the total weight of the aqueous solution of ammonium hydroxide, and thereafter removing the resulting flocculent complex thus formed. In this manner we have provided for an effective means for removing the acidic boron trifluoride catalyst from the reaction mass so that the alkyl phenols contained in the mass are stabilized against dealkylation and decomposition when heated in subsequent processes such as fractional distillation and condensation reactions. The crude reaction mixtures containing boron trifluoride and alkylated phenol are prepared by reacting a phenol with an alkylating agent in the presence of boron trifluoride.

In accordance with our invention we have discovered that a flocculent complex, in the form of a readily filterable precipitate, is formed when a crude reaction mixture containing from 0.5 percent to about 2.0 percent boron trifluoride, based on the total weight of the mixture including phenol and alkyl phenol is treated with an aqueous ammonium hydroxide solution containing from about 15 percent to about 30 percent ammonia. The exact nature and structure of this complex is unknown. However, it is known that this complex is made up of boron trifluoride, ammonia and water.

The formation of a filterable precipitate when boron trifluoride contained in crude reaction mixtures containing alkylated phenols, is neutralized by aqueous ammonium hydroxide solutions containing from about 15% to about 30% by weight of ammonia is surprising because the addition of aqueous ammonium hydroxide solutions containing less than about 15 percent ammonia and/or other alkalies will form an unfilterable suspension in such crude reaction mixtures, containing boron trifluoride. Likewise, the addition of gaseous ammonia will form an unfilterable suspension in such crude reaction mixtures, containing boron trifluoride. Similar unfilterable suspensions are formed when other alkalies such as sodium hydroxide, sodium carbonate, potassium hydroxide or solutions of such other alkalies are added to these crude reaction mixtures containing boron trifluoride, phenol and alkyl phenol.

In alkylation reactions where boron trifluoride is used as an alkylation catalyst to effect the alkylation of phenol with an alkylation agent such as an olefin, the resulting crude reaction products have a color ranging from red to reddish orange. When these mixtures are neutralized with aqueous ammonium hydroxide solutions containing from about 15 percent to about 30 percent ammonia, the neutralized mixture has a color which is greatly different from the red to red orange color of the mixture before neutralization. That is, the neutralized material has a color ranging from pale yellow to an almost colorless material. This color change provides those utilizing the process disclosed in this invention with an efficient indicator for determining the amount of ammonium hydroxide which must be added to the reaction mixture to neutralize the boron trifluoride contained therein. Sufficient ammonium hydroxide should be added to raise the pH of the crude reaction mixture to at least about 6.0.

Upon completion of the neutralization of the crude reaction mixture in accordance with the process disclosed in this invention the flocculent complex formed therein is removed from the mixture by physical means such as filtration or centrifugation followed by decantation.

The remaining mixture may then be fractionally distilled to individually isolate any excess phenol, monoalkyl phenol and polyalkyl phenols contained in the mixture. The practice of our invention upon crude reaction mixtures which contain the desired alkylated phenol as well as the boron trifluoride catalyst prevents any dealkylation of the alkyl phenol contained in this mixture during this fractional distillation. The alkyl phenols may even be directly condensed with lower alkylene oxides in the presence of a basic catalyst such as potassium hydroxide immediately after removal of the flocculent complex formed by the process of this invention without such fractional distillation if so desired, without causing any dealkylation of the alkyl phenol in crude reaction mixture.

The process disclosed in the present invention can be practiced with good results in the neutralization and/or the removal of boron trifluoride from any solution containing boron trifluoride and alkyl phenol where the problem of neutralizing and/or removing boron trifluoride arises.

In general the alkyl phenols which are treated for removal of the catalyst by the process of this invention are produced by mixing phenol and boron trifluoride, heating the mixture and adding the alkylation agent to the mixture at a rate that will favor the formation of alkyl phenol. The amount of heat and the rate at which the alkylating agent is added to the mixture must be determined experimentally for each alkylation system. The process of our invention is ideally applicable to reaction mixtures of alkyl phenols wherein the alkyl groups or group contain from 2 to 20 carbon atoms per group. The alkylation agents that have been found suitable for use are those aliphatic olefins containing from 2 to 20 carbon atoms or mixtures thereof. Exemplary of aliphatic olefins that have been found suitable as alkylation agents are ethylene, propylene, butylene, isobutylene, diisobutylene, triisobutylene, octene, nonene, decene, cetene, etc. and mixtures thereof. It is obvious that when alkyl halides are used as the alkylating agents to prepare the alkyl phenols our process will function equally as well.

The ratios of phenol to alkylation agent that may be employed in producing alkyl phenols which can be treated by the process of our invention varies widely, depending on the reaction temperatures, amount of boron trifluoride and the particular alkylation agent used to prepare the alkyl phenol. These ratios may easily be found by experimentation. It is to be understood that our invention is directed to the neutralization and removal of boron trifluoride from crude reaction mixtures containing alkyl phenol and boron trifluoride, and is not limited by the manner in which these mixtures are produced.

Due to the diverse nature of the molar proportions and reaction conditions employed in the preparation of individual alkylated phenols or other mixtures, it is impossible to set forth specific reactions and molar proportions which will adequately encompass the preparation of alkyl phenols. However, such conditions and proportions can easily be determined by anyone skilled in the art.

The water contained in the aqueous solution of ammonium hydroxide which is added to the crude reaction product containing alkyl phenol and boron trifluoride in accordance with the process disclosed in our invention is partially utilized in the formation of the boron trifluoride, water, and ammonium hydroxide complex. The amount of water remaining in the alkyl phenol solution is negligible. However, when it is desirable or necessary to remove this water, it may be easily removed by heating or evaporating the water from the solution after the complex has been removed from the solution.

Thus it is readily apparent that our novel process provides an economical and efficient process for stabilizing crude reaction mixtures containing boron trifluoride, phenol and alkyl phenols against dealkylation of the alkyl phenol contained therein.

The process disclosed in this invention can easily be incorporated into a continuous batch system or a continuous flow system for the production of alkyl phenols. Further, our process employs the equipment normally used in the prior art and does not require the purchase of any new equipment. Thus our process is a more economical one for producing stabilized alkyl phenols than those found in the prior art.

For a fuller understanding of the nature and objects of the invention reference should be had to the following examples which are given merely as further illustrations of the invention and are not to be construed in a limiting sense.

EXAMPLE I

In this example, 10.7 grams of boron trifluoride were added to 564 grams (6 moles) of U.S.P. grade phenol in a reaction vessel. Thereafter 504 grams (4 moles) of nonene (a propylene trimer) were added dropwise to the charge in the reaction vessel, the heat of reaction maintaining the temperature of the reaction mass at 70°±3° C. The reaction mass was then held at 70° C. for 30 minutes and the reaction was complete. The nonyl phenol solution thus produced had a bright red color.

Four different 100 gram portions of the nonyl phenol solution produced in the example were taken out and neutralized by adding dropwise aqueous ammonium hydroxide solutions having varied concentrations of ammonia. The temperature of the portions was maintained at 25° C. during the neutralization. The results of these neutralizations and the quantity and concentrations of the aqueous ammonium hydroxide solutions added to each portion are tabulated in Table I as follows:

*Table I*

| Portion No. | Ammonia concentration, percent | Amount of Ammonium Hydroxide solution added, grams | Amount and Appearance of precipitated complex | Color of Neutralized Alkyl Phenol |
|---|---|---|---|---|
| 1 | 30 | 0.8 | Heavy dense, easily filterable, large amount. | Light Yellow. |
| 2 | 20 | 1.3 | Heavy granular, easily filterable, large amount. | Do. |
| 3 | 15 | 1.7 | Fine, filterable, small amount. | Light Pink. |
| 4 | 10 | 2.5 | Colloidal, small amt. unfilterable. | Pink. |

From the above example it is readily apparent that when boron trifluoride is employed as a catalyst in effecting the alkylation of phenol, the boron trifluoride contained in the resulting solution of alkyl phenols may easily and effectively be neutralized and removed by utilizing the process disclosed in this invention. Furthermore the example discloses that aqueous ammonium hydroxide solutions containing less than about 15% by weight of ammonia, based on the weight of the aqueous ammonium hydroxide solution, are ineffective in completely neutralizing and precipitating boron trifluoride as a filterable complex from such resulting solutions. Note that even though the amount of ammonia in each portion is approximately the same, yet only when our concentrations are used does a precipitate form which can easily be removed.

EXAMPLE II

Ammonia gas was added to a 100 gram portion of unneutralized nonyl phenol solution prepared in Example I. The temperature of the portion was maintained at 25° C. during the adddition of the gaseous ammonia. Sufficient ammonia was added to neutralize the nonyl phenol solution. At the completion of the neutralization which was indicated when the color of the nonyl phenol solution had changed to yellow, a colloidal unfilterable precipitate was observed which did not settle on standing one day.

EXAMPLE III 1.2 grams of an aqueous sodium hydroxide solution (50% concentration) was added dropwise to a 100 gram portion of the unneutralized nonyl phenol solution prepared in Example I. The temperature of the portion was maintained at 25° C. during the neutralization. The resulting neutralized nonyl phenol solution was cloudy in appearance and pink in color indicating incomplete neutralization. It was then heated up to 70° C. and cooled. The color and appearance of the neutralized nonyl phenol remained unchanged.

From the above example it is readily apparent that alkali hydroxides, such s sodium hydroxide, are ineffective in completely neutralizing and precipitating boron trifluoride as a filterable complex from solutions of alkyl phenols containing boron trifluoride.

EXAMPLE IV

In this example, 1.16 grams of boron trifluoride were added to 180 grams (2 moles) of phenol in a reaction vessel. Thereafter 126 grams (1 mole) of nonene (a propylene trimer) were added dropwise to the charge in the reaction vessel. During the addition of the nonene to the charge in the reaction vessel the temperature of the reaction mass was maintained at 70°±3° C. The reaction mass was then held at 70° C. for 30 minutes and the reaction was then complete. Upon completion of the reaction the boron trifluoride contained in the nonyl phenol solution was neutralized by adding 2.3 grams of an aqueous solution of amonium hydroxide having a concentration of 30% by weight of ammonia based on the total weight of the ammonium hydroxide solution and the resulting precipitate was filtered off to yield a water white liquid containing phenol, nonyl phenol, and dinonyl phenol. The phenol and nonyl phenol were removed by distillation. The residue remaining in the reaction vessel was light yellow in color and had a refractive index of 1.4988. The refractive index of pure dinonyl phenol is 1.4975. Thus it was determined that this residue was practically pure dinonyl phenol.

A control was performed for this example in the manner as above, except that the boron trifluoride was not neutralized and removed as above, but was removed by distillation. In the control, upon distillation of the boron trifluoride, excess phenol, nonyl phenol from the reaction mass, the amount of residue of the reaction mass was sharply increased and appeared to be a black tarry mass having a dinonyl phenol content of only 60% as determined by gas chromatography. The remainder of the residue was judged to be decomposition products of the reactants and catalyst.

From this example, it is readily apparent that both increased yields and purity of the reaction products can be obtained, when the process of this invention is utilized in the production of alkyl phenols.

Having described our invention, what we claim as new and desire to secure by Letters Patent is:

1. In a process for the production of stabilized alkyl phenols by the reaction of phenol with an alkylating agent in the presence of boron trifluoride, the steps which comprise neutralizing the boron trifluoride contained in the resulting crude reaction product mixture with an aqueous solution of ammonium hydroxide, said solution containing from about 15 percent to about 30 percent by weight of ammonia, based upon the total weight of said aqueous ammonium hydroxide solution, said aqueous solution of ammonium hydroxide being added to said reaction product mixture in an amount sufficient to raise the pH of said reaction product mixture to at least about 6 and thereafter removing the resulting precipitate from said neutralized solution.

2. The process of claim 1, wherein said aqueous ammonium hydroxide solution contains about 28 percent by weight of ammonia, based upon the total weight of said aqueous solution of ammonium hydroxide solution.

3. The process of claim 1, wherein said alkylating agent is nonene.

4. The process of claim 1, wherein said alkylating agent is diisobutylene.

References Cited in the file of this patent

UNITED STATES PATENTS

| | | |
|---|---|---|
| 2,167,358 | Gleason | July 25, 1939 |
| 2,739,172 | Peters | Mar. 20, 1956 |

FOREIGN PATENTS

| | | |
|---|---|---|
| 827,469 | France | Jan. 24, 1938 |

OTHER REFERENCES

Laubengayer et al.: Jour. Amer. Chem. Soc., vol. 70 (1948), pages 2274–2276 (3 pages).